(12) United States Patent
Wahlström

(10) Patent No.: US 11,781,458 B2
(45) Date of Patent: Oct. 10, 2023

(54) EXHAUST AFTERTREATMENT ARRANGEMENT FOR CLEANING EXHAUST GASES

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/804,417

(22) Filed: May 27, 2022

(65) Prior Publication Data

US 2022/0381172 A1 Dec. 1, 2022

(30) Foreign Application Priority Data

Jun. 1, 2021 (EP) ..................................... 21177031

(51) Int. Cl.
*F01N 3/20* (2006.01)
*F01N 3/027* (2006.01)
(Continued)

(52) U.S. Cl.
CPC .............. *F01N 3/208* (2013.01); *F01N 3/027* (2013.01); *F01N 3/0275* (2013.01); *F01N 3/0293* (2013.01); *F01N 3/0892* (2013.01); *F01N 3/2013* (2013.01); *F01N 2240/04* (2013.01); *F01N 2550/22* (2013.01); *F01N 2610/02* (2013.01); *F01N 2610/10* (2013.01);
(Continued)

(58) Field of Classification Search
CPC combination set(s) only.
See application file for complete search history.

(56) References Cited

U.S. PATENT DOCUMENTS

| 4,686,827 A * | 8/1987 | Wade | F02D 41/029 422/174 |
| 5,293,742 A * | 3/1994 | Gillingham | F01N 3/0226 60/303 |

(Continued)

FOREIGN PATENT DOCUMENTS

| DE | 102005026032 A1 | 12/2006 |
| EP | 1481719 A2 | 12/2004 |

(Continued)

OTHER PUBLICATIONS

Extended European Search Report in corresponding European Application No. 21177031.8 dated Nov. 9, 2021 (7 pages).

*Primary Examiner* — Binh Q Tran
(74) *Attorney, Agent, or Firm* — Venable LLP; Jeffri A. Kaminski

(57) ABSTRACT

An exhaust aftertreatment arrangement for cleaning exhaust gases includes a fluid channel for providing a fluid pathway for the exhaust gases, a selective catalyst reduction, SCR, catalyst, arranged in or downstream the fluid channel, a heating arrangement for heating the exhaust gases, the heating arrangement being arranged upstream of the SCR catalyst and comprising an electrical heating element, a first fluid pathway for guiding the exhaust gases to the electrical heating element, and a second fluid pathway for guiding the exhaust gases to bypass the electrical heating element, wherein the heating arrangement is removably arranged relative the fluid channel.

15 Claims, 6 Drawing Sheets

(51) Int. Cl.
*F01N 3/029* (2006.01)
*F01N 3/08* (2006.01)

(52) U.S. Cl.
CPC .... *F01N 2610/102* (2013.01); *F01N 2900/04* (2013.01); *F01N 2900/18* (2013.01)

(56) References Cited

U.S. PATENT DOCUMENTS

| | | | |
|---|---|---|---|
| 5,412,943 A * | 5/1995 | Hosoya | F01N 11/002 60/276 |
| 7,509,799 B2 * | 3/2009 | Amou | B01D 53/9495 60/287 |
| 8,828,342 B1 | 9/2014 | Tyo et al. | |
| 10,961,884 B1 * | 3/2021 | Dadam | F01N 1/165 |
| 2017/0254250 A1 * | 9/2017 | Steinhauser | F01N 9/002 |
| 2018/0058297 A1 * | 3/2018 | Sharp | F01N 3/027 |
| 2018/0119591 A1 * | 5/2018 | Everly | F01N 3/2013 |
| 2020/0370455 A1 | 11/2020 | Joshi et al. | |

FOREIGN PATENT DOCUMENTS

| | | |
|---|---|---|
| EP | 1481719 A3 | 4/2005 |
| EP | 2101049 A2 | 9/2009 |
| EP | 2101049 A3 | 4/2010 |

\* cited by examiner

EXHAUST AFTERTREATMENT ARRANGEMENT FOR CLEANING EXHAUST GASES

TECHNICAL FIELD

The present invention relates to an exhaust aftertreatment arrangement for cleaning exhaust gases. The invention further relates to a heating arrangement for an exhaust aftertreatment arrangement, a vehicle comprising an exhaust aftertreatment arrangement or a heating arrangement, and to a method for assembling and/or disassembling a heating arrangement relative a fluid channel of an exhaust aftertreatment arrangement.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes a diesel oxidation catalyst, DOC, a diesel particulate filter, DPF, and a selective catalytic reduction SCR catalyst. A reductant, such as urea or an ammonia comprising substance, is injected upstream of the SCR catalyst to assist in converting nitrogen oxides, also referred to as NOx, with the aid of a catalyst, into diatomic nitrogen, N2, and water, and potentially carbon dioxide CO2 (depending on the choice of reductant). The cleaned, or at least emission reduced, exhaust gases then leaves the EATS and the vehicle through the tailpipe of the vehicle. Other types of engines causing similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea require heat to evaporate and hydrolize into ammonia. If the temperature is low, there is a large risk for creating crystallization and deposits that reduce the effect of the EATS.

Electrical heating elements may be used to heat the exhaust gases to counteract the low temperature of the exhaust gases and reduce the associated disadvantages. However, the addition of electrical heating elements to the EATS increase the complexity of the system, and/or add components that risk being subject to failure and in need of maintenance or exchange. Furthermore, heating of exhaust gases by means of an electrical heating element typically induces an undesired pressure drop in the EATS.

Thus, there is a need in the industry for an improved EATS aiming to alleviate the above-mentioned drawbacks.

SUMMARY

It is an object of the present invention to at least partly alleviate the shortcomings discussed above in relation to known exhaust aftertreatment systems, and to provide an improved exhaust aftertreatment arrangement.

According to a first aspect of the present invention, an exhaust aftertreatment arrangement for cleaning exhaust gases is provided. The exhaust aftertreatment arrangement comprises:
- a fluid channel for providing a fluid pathway for the exhaust gases,
- a selective catalyst reduction, SCR, catalyst, arranged in or downstream the fluid channel,
- a heating arrangement for heating the exhaust gases, the heating arrangement being arranged upstream of the SCR catalyst and comprising an electrical heating element, a first fluid pathway for guiding the exhaust gases to the electrical heating element, and a second fluid pathway for guiding the exhaust gases to bypass the electrical heating element, wherein the heating arrangement is removably arranged relative the fluid channel.

Thus, the shortcomings of low temperatures of the exhaust gases is alleviated by means of the electrical heating element, and the pressure drop in the fluid channel may be limited by utilizing the second fluid pathway guiding the exhaust gases to bypass the electrical heating element, while the heating arrangement is yet easily removable from the fluid channel for accessing the components and fluid pathways therein. Hereby, at least the electrical heating element and the first and second fluid pathways are made accessible e.g. for maintenance. That is, the heating arrangement is configured to be removable from the fluid channel and the components and fluid pathways therein may be made accessible e.g. for maintenance. Moreover, the electrical heating element may easily be accessed for removal from the heating arrangement in case the electrical heating element should be replaced or be subject to maintenance externally of the exhaust aftertreatment system. The invention provides a combination of a simple configuration enabling easy access to the components and fluid pathways of the heating arrangement while improving the performance of the exhaust aftertreatment arrangement. Thus, an improved exhaust aftertreatment arrangement is provided with a highly efficient removal of emission of the exhaust gases owing at least to the heating of the exhaust gases by the electrical heating element, and with a configuration enabling a reduced pressure drop owing at least to the second fluid pathway providing a bypass of the electrical heating element, while reducing the additional complexity of the heating arrangement as it is removably arranged relative the fluid channel. Owing to the second fluid pathway, at least a part of the exhaust gases may be guided from upstream the heating arrangement to downstream the heating arrangement without passing the electrical heating element.

It should be understood that the induced pressure drop, owing to the flow of exhaust gases through the heating arrangement, in the first fluid pathway and the second fluid pathway are different for the same flow of exhaust gases. That is, for the same flow of exhaust gases, the first fluid pathway induces a larger pressure drop than the second fluid pathway, owing at least to the presence of the electrical heating element in the first fluid pathway. Thus, the second fluid pathway is typically free of any electrical heating element or corresponding means obstructing the flow in a similar way as the electrical heating element in the first fluid pathway.

As the heating arrangement is removably arranged relative the fluid channel, it is arrangeable in an assembled state in which the heating arrangement is arranged in the fluid channel, or forms an integrated part of the fluid channel, to be in direct fluid communication with the fluid channel, and is arrangeable in a disassembled state in which the heating arrangement is removed, or detached, from the fluid channel. During use of the exhaust aftertreatment arrangement, i.e. when using the exhaust aftertreatment arrangement for converting NOx emissions, the heating arrangement is arranged in the assembled state. The disassembled state may e.g. be used during maintenance of the heating arrangement or any components or fluid pathways therein.

According to at least one example embodiment, the heating arrangement comprises a first channel portion comprising the first fluid pathway and the electrical heating element, and a second channel portion comprising the second fluid pathway, the second channel portion being separate from the first channel portion.

Hereby, each of the first and second fluid pathways are comprised in a separate channel portion. Thus, exhaust gases may be divided into the first and second fluid pathways in an effective manner, and mixing of the exhaust gases in the first and second fluid pathways may be avoided. Moreover, by providing the first and second channel portions in the heating arrangement, the first and second channel portions may be easily accessed upon removal of the heating arrangement from the fluid channel. Thus, the first and second channel portions may be easily accessed for maintenance.

According to at least one example embodiment, the first and second channel portions may comprise channel walls circumferentially encompassing the first and second fluid pathway, respectively. According to at least one example embodiment, the channel walls of the first channel portion and/or the second channel portion define an at least partly curved cross section. That is, the cross section of the first and/or second channel portions are at least partly curved. According to at least one example embodiment, the electrical heating element is covering the whole cross section of the first channel portion, such that the exhaust gases flowing through the first fluid pathway is prevented from by-passing the electrical heating element. Stated differently, the electrical heating element may be circumferentially and sealingly attached to the channel walls of the first channel portion.

According to at least one example embodiment, the first channel portion and the second channel portion are co-axially arranged.

Hereby, a compact configuration of the first and second channel portions is provided. Thus, by providing the first channel portion and the second channel portion co-axially arranged within the heating arrangement, the heating arrangement may be made compact. Thus, a suitable configuration for having the heating arrangement removably arranged relative the fluid channel is provided.

According to at least one example embodiment, the first channel portion is annularly encompassing the second channel portion, or the second channel portion is annularly encompassing the first channel portion.

Hereby, a compact configuration of the first and second channel portions is provided. Thus, by providing encompassing first and second channel portions within the heating arrangement, the heating arrangement may be made compact. Thus, a suitable configuration for having the heating arrangement removably arranged relative the fluid channel is provided.

According to at least one example embodiment, the first and second channel portions are adjacent. Stated differently, the channel walls of the first or second channel portion are separating the first fluid pathway from the second fluid pathway.

For embodiments in which the first channel portion is annularly encompassing the second channel portion, the channel walls which at least partly defines the second channel portion has an inner wall surface facing the second channel portion, and an outer wall surface facing the first channel portion. Correspondingly, for embodiments in which the second channel portion is annularly encompassing the first channel portion, the channel walls which at least partly defines the first channel portion has an inner wall surface facing the first channel portion, and an outer wall surface facing the second channel portion.

According to at least one example embodiment, the second channel portion has a circular or tubular cross section, and the first channel portion has an annular cross section (i.e. has the shape of an annulus). Thus, the circular cross section of the second channel portion may be encompassed of the annular cross section of the first channel portion. According to at least one alternative example embodiment, the first channel portion has a circular or tubular cross section, and the second channel portion has an annular cross section (i.e. has the shape of an annulus). Thus, the circular cross section of the first channel portion may be encompassed of the annular cross section of the second channel portion.

According to at least one example embodiment, the exhaust aftertreatment arrangement further comprises at least one valve configured to control the flow of exhaust gases in the first and second fluid pathways.

Hereby, the flow of exhaust gases may be controlled and divided between the first and second fluid pathways in a straightforward manner. Typically, the heating arrangement is, in the assembled state, arranged such that the valve controls the flow of exhaust gases to the first fluid pathway and/or to the second fluid pathway. Stated differently, the valve is configured to control the flow of exhaust gases by directing, or guiding, the exhaust gases to the first fluid pathway in which the exhaust gases pass the electrical heating element, and to the second fluid pathway in which the exhaust gases by-passes the electrical heating element.

According to at least one example embodiment, the heating arrangement comprises the valve.

Hereby, the valve is arranged close or adjacent to the first and second fluid pathways, and may thus effectively control the flow of exhaust gases to the first and second fluid pathways. Moreover, by having the valve comprised in the removably arranged heating arrangement, the valve may easily be accessed upon removal of the heating arrangement from the fluid channel, and may thus be subject to maintenance or exchange. According to at least one example embodiment, the valve is integrated into the heating arrangement, e.g. by being integrated into the first or second fluid pathways, such as e.g. being integrated into the first or second channel portion.

According to at least one example embodiment, the valve is configured to control flow of exhaust gases into the first fluid pathway and/or flow of exhaust gases into the second fluid pathways. For example, the valve may be configured to control the flow of exhaust gases by interchangeably enabling and preventing flow of exhaust gases into the first fluid pathway. Additionally or alternatively, the valve may be configured to control the flow of exhaust gases by interchangeably enabling and preventing flow of exhaust gases into the second fluid pathway. Additionally or alternatively, the valve may be configured to control the flow of exhaust gases by enabling flow of exhaust gases into the first or second fluid pathway while optionally preventing flow of exhaust gases into the other one of the first or second fluid pathway. Optionally and additionally, the valve may be configured to control the flow of exhaust gases by interchangeably enabling flow of exhaust gases into the first or second fluid pathway, and preventing flow of exhaust gases into the same first or second fluid pathway.

According to at least one example embodiment, the valve is operable between a first state in which the flow of exhaust gases is allowed to flow through the first fluid pathway, and a second state in which at least a part of the flow of exhaust gases is allowed to flow through the second fluid pathway.

Hereby, the exhaust gases may be heated by the electrical heating element in the first state, while the pressure drop is reduced in the second state as at least a part of the flow of exhaust gases by-passes the electrical heating element by being allowed to flow through the second fluid pathway. In more detail, in the first state, the valve is arranged to allow the flow of exhaust gases to enter the first fluid pathway such that no, or very little, of the exhaust gases is allowed to the second fluid pathway. For example, the valve may be configured to prevent flow of exhaust gases into the second fluid pathway in the first state. Hereby, all, or almost all, of the exhaust gases are allowed to the first fluid pathway and may thus be heated by the electrical heating element. In the second state, the valve is arranged to allow at least a part of the flow of exhaust gases to the second fluid pathway. Thus, in the second state, at least a part of the flow of exhaust gases may be allowed, or at least be enabled to flow, into the first fluid pathway, and thereby be heated by the electrical heating element. However, as at least a part of the flow of exhaust gases are allowed to the second fluid pathway, and thereby by-passing the electrical heating element, the pressure drop will be reduced compared to if the complete flow of exhaust gases were to be led through the first fluid pathway (as e.g. could be the case in the first state). According to at least one example embodiment, the valve is arranged in the second state to prevent flow of exhaust gases into the first fluid pathway. Hereby, the pressure drop may be decreased even further. The valve is e.g. operable to allow the flow of exhaust gases to the first fluid pathway, and/or the second fluid pathway by directing, or guiding, the flow of exhaust gases. That is, the valve may be configured to direct, or guide, the flow of exhaust gases to the first fluid pathway in the first state, and configured to direct, or guide, at least a part of the flow of exhaust gases to the second fluid pathway in the second state.

Thus, the valve may be configured to:
in a first state, allow the flow of exhaust gases to the first fluid pathway while preventing flow of exhaust gases into the second fluid pathway, and
in a second state, allow the flow of exhaust gases to the second fluid pathway and optionally the first fluid pathway.

According to at least one example embodiment, the fluid channel comprises a first channel flange arranged upstream of the SCR catalyst, and the heating arrangement comprises a first heating arrangement flange, such that, in the assembled state, the first channel flange is circumferentially connected to the first heating arrangement flange, wherein the heating arrangement is removably arranged relative the fluid channel at least by that the first channel flange is removably connected to the first heating arrangement flange.

Hereby, a simple yet effective means for removably arranging the heating arrangement relative the fluid channel is provided. For example, the first channel flange may be a flange at an end portion of the fluid channel, and the heating arrangement may thus be removably arranged, or removably connected, to such end portion of the fluid channel by means of the first channel flange and the first heating arrangement flange. Thus, during use, flow of exhaust gases is entering the fluid channel via the heating arrangement. Stated differently, the first channel flange is circumferentially connectable to the first heating arrangement flange, or the first channel flange is configured to be circumferentially connected to the first heating arrangement flange.

According to at least one example embodiment, the fluid channel further comprises a second channel flange arranged upstream of the first channel flange, wherein the heating arrangement further comprises a second heating arrangement flange arranged opposite to the first heating arrangement flange, such that, in the assembled state, the second channel flange is circumferentially connected to the second heating arrangement flange, and wherein the heating arrangement is removably arranged relative the fluid channel by that the first channel flange is removably connected to the first heating arrangement flange and by that the second channel flange is removably connected to the second heating arrangement flange.

Hereby, yet another simple and effective means for removably arranging the heating arrangement relative the fluid channel is provided. In other words, the heating arrangement is removably arranged in the fluid channel. Thus, the heating arrangement may form a part of the fluid pathway when connected to the fluid channel in the assembled state. The fluid pathway may here be referred to an overall fluid pathway, or exhaust aftertreatment fluid pathway. Thus, the first and second fluid pathways of the heating arrangement typically form at least a respective sub-portion of the overall fluid pathway. The fluid channel may comprise a downstream channel portion downstream of the first channel flange, and an upstream channel portion upstream of the second channel flange. Hereby, the heating arrangement is removably arranged in the fluid channel to fluidly connect the upstream channel portion with the downstream channel portion. Thus, when the heating arrangement is removed from the fluid channel, the fluid channel is divided into the two separate channel portions, i.e. the upstream and downstream channel portions. The upstream channel portion is typically extending upstream from the second channel flange, and the downstream channel portion is typically extending downstream from the first channel flange. Thus, during use, the flow of exhaust gases is entering the upstream channel portion and are passed to the downstream channel portion via the heating arrangement and the first and/or second fluid pathways. Stated differently, the second channel flange is circumferentially connectable to the second heating arrangement flange, or the second channel flange is configured to be circumferentially connected to the second heating arrangement flange. The downstream channel portion may comprise a flexible pipe. The upstream channel portion may be fluidly connected to, or be comprised in, an outlet part of a turbo charger.

According to at least one example embodiment, the heating arrangement comprises an enclosing channel wall portion extending up to the first heating arrangement flange, and wherein the first and second fluid pathways are housed in the enclosing channel wall portion.

Thus, the components of the heating arrangement may be housed within the enclosing channel wall portion, and easily removed collectively with the heating arrangement. The enclosing channel wall portion may be referred to as a casing, or housing, of the heating arrangement. Thus, in the assembled state, the enclosing channel wall portion extends from the upstream channel portion to the downstream channel portion, or simply receives the exhaust gases and guides them further to the fluid channel.

According to at least one example embodiment, the exhaust aftertreatment arrangement comprises an injector configured to inject a liquid reductant for providing ammonia to the SCR catalyst, the injector being arranged upstream of the SCR catalyst. Typically, the injector is arranged between the heating arrangement and the SCR catalyst.

According to at least one example embodiment, the SCR catalyst is arranged in the fluid channel downstream of the injector. Alternatively, the SCR catalyst is arranged downstream the fluid channel. For example, the fluid channel may end, or exit, into the SCR catalyst.

According to at least one example embodiment, the electrical heating element of the heating arrangement is, in the assembled state, arranged upstream of the injector. Thus, exhaust gases heated by the electrical heating element may be heated prior to encountering the injected reductant. According to at least one example embodiment, in the assembled state, the injector is arranged between the heating arrangement and the SCR catalyst. According to at least one example embodiment, the injector is arranged to inject the reductant into the fluid channel. According to at least one example embodiment, the injector is arranged just downstream the first channel flange, e.g. within 1-20 cm, of the first channel flange. The distance being the flow path distance between the injector and the first channel flange.

According to at least one example embodiment, the heating arrangement is configured to heat the injected reductant indirectly via heating of the exhaust gases passing the electrical heating element. Thus, the heated exhaust gases heat the injected reductant subsequently to passing the electrical heating element.

According to at least one example embodiment, the heating arrangement is formed as a channel bend.

Hereby, exhaust gases flowing through the heating arrangement may be subject to increased mixing, and the heating of the exhaust gases may be improved. Moreover, by providing the electrical heating element within the heating arrangement formed as a channel bend, the electrical heating element may be better protected from injected reductant. Moreover, the heating arrangement may connect the upstream channel portion with the downstream channel portion while the channel bend provides a bend, or curve, of the fluid channel.

According to at least one example embodiment, the heating arrangement comprises a mixing unit arranged in the first and/or second fluid pathways. The mixing unit is configured to create a swirling or tumbling flow of the exhaust gases. Preferably, the mixing unit is arranged at an end portion of the second fluid pathway, such as e.g. at an end portion of the second channel portion or at an end portion of the heating arrangement, to improve mixing of the flow of exhaust gases downstream of the heating arrangement. Hereby, any heated exhaust gases from the first fluid pathway may be mixed with the exhaust gases from the second fluid pathway in an advantageous manner.

According to at least one example embodiment, the heating arrangement is arranged such that, in use, the injected liquid reductant is prevented from being brought into contact with the electrical heating element.

For example, the electrical heating element is arranged upstream of the injector at a distance not reachable for any injected liquid reductant. According to another example, the electrical heating element is arranged behind a bend (as e.g. described above with the channel bend).

According to a second aspect of the invention, a heating arrangement for an exhaust aftertreatment arrangement for converting NOx emissions is provided. The exhaust aftertreatment arrangement comprises a fluid channel for providing a fluid pathway for the exhaust gases and a selective catalyst reduction, SCR, catalyst, arranged in or downstream the fluid channel, wherein the heating arrangement comprises:

an electrical heating element, a first fluid pathway for guiding the exhaust gases to the electrical heating element, and a second fluid pathway for guiding the exhaust gases to bypass the electrical heating element, wherein the heating arrangement is configured to be removably arranged relative the fluid channel.

Effects and features of the second aspect of the invention are largely analogous to those described above in connection with the first aspect of the invention, at least in relation to the heating arrangement. Embodiments mentioned in relation to the first aspect of the invention, at least in relation to the heating arrangement, are largely compatible with the second aspect of the invention. Thus, for example, the electrical heating arrangement is able to be removably arranged relative the fluid channel upstream of the SCR catalyst.

According to at least one example embodiment, the heating arrangement further comprises a first heating arrangement flange and a second heating arrangement flange arranged opposite to the first heating arrangement flange, wherein the first heating arrangement flange is circumferentially connectable to a first channel flange of the fluid channel, and the second heating arrangement flange is circumferentially connectable to a second channel flange of the fluid channel.

The first and second fluid channel flanges of the fluid channel has been described with reference to the first aspect of the invention. Hereby, the heating arrangement may be removably arranged to the fluid channel. Thus, the heating arrangement is arrangeable in an assembled state in relation to the fluid channel in such a way that the first heating arrangement flange is circumferentially connected to the first channel flange of the fluid channel, and that the second heating arrangement flange is circumferentially connected to the second channel flange of the fluid channel. Moreover, the first heating arrangement flange is removably connectable to the first channel flange of the fluid channel, and the second heating arrangement flange is removably connectable to the second channel flange of the fluid channel, such that the heating arrangement is arrangeable in a disassembled state relative the fluid channel.

According to at least one example embodiment, the heating arrangement comprises at least one valve configured to control the flow of exhaust gases in the first and second fluid pathways.

According to a third aspect of the invention, a heating arrangement for an exhaust aftertreatment arrangement for converting NOx emissions, is provided. The heating arrangement comprises an electrical heating element, a first fluid pathway for guiding the exhaust gases to the electrical heating element, and a second fluid pathway for guiding the exhaust gases to bypass the electrical heating element, wherein the heating arrangement is configured to be removably arranged relative the fluid channel.

Effects and features of the third aspect of the invention are largely analogous to those described above in connection with the first aspect of the invention, at least in relation to the heating arrangement. Embodiments mentioned in relation to the first aspect of the invention, at least in relation to the heating arrangement, are largely compatible with the third aspect of the invention, of which some embodiments are mentioned below. Thus, the electrical heating arrangement is able to be removably arranged relative the fluid channel upstream of the SCR catalyst.

According to at least one example embodiment, the heating arrangement comprises at least one valve configured to control the flow of exhaust gases in the first and second fluid pathways.

According to at least one example embodiment, the heating arrangement comprises a first heating arrangement flange.

According to at least one example embodiment, the heating arrangement further comprises a second heating arrangement flange arranged opposite to the first heating arrangement flange.

According to at least one example embodiment, the heating arrangement further comprises an enclosing channel wall portion extending between the first heating arrangement flange and the second heating arrangement flange, wherein the first and second fluid pathways are housed in the enclosing channel wall portion.

According to at least one example embodiment, the heating arrangement comprises a first channel portion comprising the first fluid pathway and the electrical heating element, and a second channel portion comprising the second fluid pathway, the second channel portion being separate from the first channel portion.

According to at least one example embodiment, the first channel portion and the second channel portion are co-axially arranged.

According to at least one example embodiment, the first channel portion is annularly encompassing the second channel portion, or the second channel portion is annularly encompassing the first channel portion.

The valve, the first and second heating arrangement flanges, the enclosing channel wall portion, the first and second channel portions were described in relation to the first aspect of the invention, and embodiments thereof are applicable to the heating arrangement of the third aspect of the invention.

According to a fourth aspect of the invention, a vehicle comprising an exhaust aftertreatment arrangement according the first aspect of the invention, or a heating arrangement according to the second or third aspects of the invention, is provided.

Effects and features of the fourth aspect of the invention are largely analogous to those described above in connection with the first and second aspects of the invention. Embodiments mentioned in relation to the first aspect of the invention are largely compatible with the fourth aspect of the invention.

According to a fifth aspect of the invention, a method for assembling and/or disassembling a heating arrangement relative a fluid channel of an exhaust aftertreatment arrangement for converting NOx emissions, is provided. The exhaust aftertreatment arrangement comprises a fluid channel for providing a fluid pathway for the exhaust gases, a selective catalyst reduction, SCR, catalyst, arranged in or downstream the fluid channel, and optionally an injector configured to inject a liquid reductant for providing ammonia to the SCR catalyst, the injector being arranged upstream of the SCR catalyst, wherein the heating arrangement comprises an electrical heating element, a first fluid pathway for guiding the exhaust gases to the electrical heating element, and a second fluid pathway for guiding the exhaust gases to bypass the electrical heating element, the heating arrangement being removably connectable to the fluid channel. The method comprises:

assembling the heating arrangement relative the fluid channel such that the heating arrangement is arranged upstream of the SCR catalyst, such that the flow of exhaust gases may be controlled to flow through the heating arrangement via the first and/or second fluid pathways, and/or disassembling the heating arrangement from the fluid channel.

Hereby, the heating arrangement may be easily connected to, and/or removed from, the fluid channel. Thus, the heating arrangement may be assembled relative the fluid channel and used for alleviating the shortcomings of low temperatures of the exhaust gases by means of the electrical heating element heating the flow of exhaust gases in the first fluid pathway, and a limited pressure drop in the fluid channel by utilizing the second fluid pathway guiding the exhaust gases to bypass the electrical heating element. Moreover, the heating arrangement may be easily disassembled for accessing the components and fluid pathways therein. Hereby, at least the electrical heating element and the first and second fluid pathways are made accessible e.g. for maintenance. That is, the heating arrangement may be removed from the fluid channel and the components and fluid pathways therein may be made accessible e.g. for maintenance. The invention provides a combination of a simple configuration enabling easy access to the components and fluid pathways of the heating arrangement after dissembling the heating arrangement, while improving the performance of the exhaust aftertreatment arrangement after assembling the heating arrangement. Thus, an improved exhaust aftertreatment arrangement is provided with a highly efficient removal of emission of the exhaust gases owing at least to the heating of the exhaust gases by the electrical heating element and with a configuration enabling a reduced pressure drop owing at least to the second fluid pathway providing a bypass of the electrical heating element, while reducing the additional complexity of the heating arrangement as it is removably arranged relative the fluid channel, and may thus be subject to assembling and disassembling.

Effects and features of the fifth aspect of the invention are largely analogous to those described above in connection with the first aspect of the invention. Embodiments mentioned in relation to the first aspect of the invention, at least in relation to the exhaust aftertreatment arrangement, are largely compatible with the fifth aspect of the invention.

According to at least one example embodiment, the method is performed on an exhaust aftertreatment arrangement in accordance with the first aspect of the invention.

According to at least one example embodiment, the fluid channel comprises a first channel flange arranged upstream of the SCR catalyst, and the heating arrangement comprises a first heating arrangement flange, wherein the step of assembling the heating arrangement relative the fluid channel comprises circumferentially connecting the first channel flange to the first heating arrangement flange, and/or wherein the step of disassembling comprises disconnecting the first channel flange from the first heating arrangement flange.

Hereby, a simple yet effective means for assembling and disassembling the heating arrangement relative the fluid channel is provided. For example, the first channel flange may be a flange at an end portion of the fluid channel, and the heating arrangement may thus be assembled, or be removably arranged, or removably connected, to such end portion of the fluid channel by means of the first channel flange and the first heating arrangement flange. Thus, during use, exhaust gases are entering the fluid channel via the heating arrangement.

According to at least one example embodiment, the fluid channel further comprises a second channel flange arranged upstream of the first channel flange, and wherein the heating arrangement further comprises a second heating arrangement flange arranged opposite to the first heating arrangement flange, wherein the step of assembling the heating arrangement relative the fluid channel comprises circumferentially connecting the first channel flange to the first heating arrangement flange and circumferentially connecting the second channel flange to the second heating arrangement flange, and/or wherein the step of disassembling comprises disconnecting the first channel flange from the first heating arrangement flange and disconnecting the second channel flange from the second heating arrangement flange.

Hereby, yet another simple and effective means for assembling and disassembling the heating arrangement relative the fluid channel is provided. Thus, the heating arrangement may, when assembled, form a part of the fluid pathway when connected to the fluid channel. In other words, the heating arrangement is assembled to, or is removably arranged in, the fluid channel. The fluid pathway may here be referred to an overall fluid pathway, or exhaust aftertreatment fluid pathway. Thus, the first and second fluid pathways of the heating arrangement typically form at least a respective sub-portion of the overall fluid pathway. The fluid channel may thus comprise a downstream channel portion downstream of the first channel flange, and an upstream channel portion upstream of the second channel flange. Hereby, the heating arrangement is assembled to, or removably arranged in, the fluid channel to fluidly connect the downstream channel portion with the upstream channel portion. Thus, when the heating arrangement is disassembled, i.e. removed from the fluid channel, the fluid channel is divided into the two separate channel portions, i.e. the downstream and upstream channel portions.

According to at least one example embodiment, applicable to any one of the first to fifth aspects of the invention, the exhaust aftertreatment arrangement further comprises an emission reducing module being a diesel particulate filter, DPF, i.e. being configured to remove particles, such as diesel particulate matter or soot, from the exhaust gases and/or a diesel oxidation catalyst, DOC arranged and configured to convert carbon monoxide and hydrocarbons into carbon dioxide. Thus, according to at least one example embodiment, the emission reducing module is a combined DPF/DOC, for example in which the DOC is arranged upstream of the DPF. According to at least one example embodiment, the emission reducing module is a DPF. According to at least one example embodiment, the emission reducing module is a DOC. The emission reducing module may e.g. be arranged upstream of the heating arrangement.

It should be understood that the electrical heating element is a heating element which is configured to be heated by means of electricity. According to at least one example embodiment, the electrical heating element comprises a lattice or a grating, or a coil or a plate, configured to be heated by electricity led through the lattice, grating, coil, or plate. The electrical heating element may be of another shape, e.g. in the shape of a flat or curved heating lamella, or comprise a heating element of a different type, e.g. a resistance foam. According to at least one example embodiment, the electrical heating element is a Positive Temperature Coefficient, PTC, based element. According to at least one example embodiment, the electrical heating element is based on induction heating and may be referred to as an induction heating element. According to at least one example embodiment, the operating power of the electrical heating element is between 300 W and 15000 W, or between 1000 W and 15000 W. According to at least one example embodiment, the operating voltage of the electrical heating element is 12V, 24V or 48V.

According to at least one example embodiment, the reductant is at least one of the following: anhydrous ammonia, aqueous ammonia, urea, aqueous urea and a diesel exhaust fluid. According to at least one example embodiment, the reductant is urea or liquid urea. The electrical heating element may thus, via the heated exhaust gases, and the evaporation member, provide the reductant with the required heat to evaporate and possibly hydrolize the reductant into ammonia. Depending on the operating power of the electrical heating element, the heated exhaust gases may additionally heat up the SCR catalyst.

According to at least one example embodiment, the heating arrangement is configured to keep the temperature downstream of the electrical heating element and upstream of the SCR catalyst above 180° C. This may e.g. be achieved by controlling the flow of exhaust gases by means of the valve to the first fluid pathway and/or the second fluid pathway. Hereby, fouling caused by the injected reductant can be reduced or even omitted. For example, the heating arrangement may be configured to keep the temperature of the exhaust gases flowing in the fluid pathway downstream of the heating arrangement and upstream of the SCR catalyst above 180° C., the temperature being e.g. measured as a mean temperature over a certain distance. The heating arrangement may be configured to keep said temperature between 180° C. and 300° C. Additionally, or alternatively, the heating arrangement is configured to keep the temperature in the SCR catalyst between 180° C. and 300° C.

According to at least one example embodiment, the heating arrangement is controlled, e.g. by means of the valve, to allow (or guide or direct) the flow of exhaust gases into the first fluid pathway in accordance with the previously described first state, and to initiate heating of the exhaust gases in response to a measured temperature upstream of the electrical heating element of below 180° C. The heating arrangement may be further controlled to terminate heating, or reduce heating, of the flow of exhaust gases in response to a measured temperature upstream of the electrical heating element of above 200° C., or in response to a measured temperature downstream of the heating arrangement (and e.g. upstream of the SCR catalyst), of above 300° C. Such termination, or reduction, of heating may be achieved by controlling the valve to allow (or guide or direct) the flow of exhaust gases at least partly to the second fluid pathway in accordance with the previously described second state, and terminating or at least reducing the supplied heat from the electrical heating element. According to at least one example embodiment, the heating arrangement is controlled to initiate heating of the exhaust gases in response to a measured temperature of the SCR catalyst below 200° C., or below 180° C. The level of heating of the electrical heating element may be controlled by varying the supplied voltage to the electrical heating element, or by the mean value based on frequently alternating power on/off.

According to at least one example embodiment, the heating arrangement is configured to adapt the temperature downstream of the heating arrangement and upstream of the SCR catalyst at least based on the temperature of the injected reductant. Hereby, the temperature of the reductant can be included in the controlling of the heating arrangement.

According to at least one example embodiment, the exhaust aftertreatment arrangement comprises a controller configured to control the introduction of reductant into the fluid pathway of the exhaust gases as a function of various exhaust gas parameters, such as NOx, temperature and pressure, for the purpose of controlling NOx concentration in exhaust gases. The exhaust gas parameters may be measured by various sensors at various locations in the exhaust aftertreatment arrangement. For example, NOx sensors may be located at, or proximate, the inlet and outlet of the exhaust aftertreatment arrangement. Temperature sensors, and/or pressure sensors, may be located before and after the heating arrangement, or the SCR catalyst. According to at least one example embodiment, the heating arrangement comprises at least one of the various sensors, or comprises a mounting for such sensor(s).

The SCR catalyst is typically configured to convert nitrogen oxides, NOx, with the aid of a catalyst into diatomic nitrogen, N2, and water and/or carbon dioxide, CO2. During use, the injected reductant (or the resulting ammonia) is reacted onto the catalyst.

The order of the method steps described in the fifth aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the fifth aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
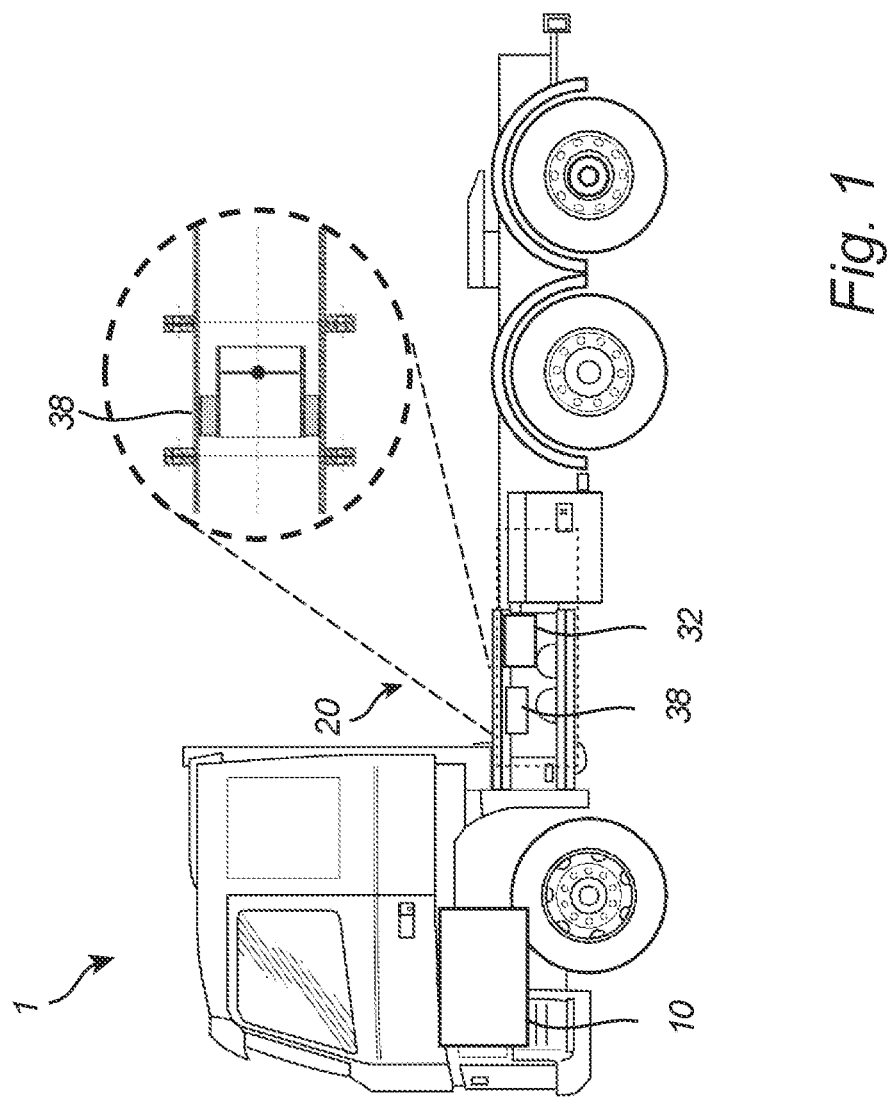
FIG. 1 is a schematic side view of a vehicle comprising an exhaust aftertreatment arrangement in accordance with an example embodiment of the invention.

With reference to FIG. 1 a vehicle 1, here embodied as a heavy duty truck 1, is shown for which an exhaust aftertreatment arrangement 20 of a kind disclosed in the present invention, and a heating arrangement 38 of a kind disclosed in the present invention, are advantageous. However, the exhaust aftertreatment system 20, and/or the heating arrangement 38, may as well be implemented in other types of vehicles, such as in busses, light-weight trucks, construction equipment, passenger cars, marine applications etc. The vehicle 1 of FIG. 1 comprises an engine 10, being a diesel engine 10, but the vehicle 1 may according to at least one example embodiment be a hybrid vehicle further comprising an electric machine (not shown). The diesel engine 10 is powered by diesel fuel, typically comprised in a fuel tank, and any electric machine is typically powered by electricity supplied from at least one energy storage or transformation device, e.g. a battery or a fuel cell.

In FIG. 1, the vehicle 1 further comprises an exhaust aftertreatment arrangement 20 for cleaning exhaust gases from at least the diesel engine 10. The exhaust aftertreatment arrangement 20 comprises at least an SCR catalyst 32 and a heating arrangement 38 for heating the exhaust gases prior to the SCR catalyst 32, as best shown in the enlargement of FIG. 1. The SCR catalyst 32 is arranged and configured to convert nitrogen oxides, also referred to as NOx, with the aid of a catalyst, into diatomic nitrogen, N2, and water, and/or carbon dioxide, CO2. Optionally, the exhaust aftertreatment system 20 further comprises an injector configured to inject a liquid reductant for providing ammonia to the SCR catalyst 32, the injector typically being arranged upstream of the SCR catalyst 32, and downstream of the heating arrangement 38. The reductant, preferably anhydrous ammonia, aqueous ammonia, urea, aqueous urea or a diesel exhaust fluid solution is added to engine exhaust gases by the injector and is absorbed onto the catalyst in the SCR catalyst 32.

Figure 2A:
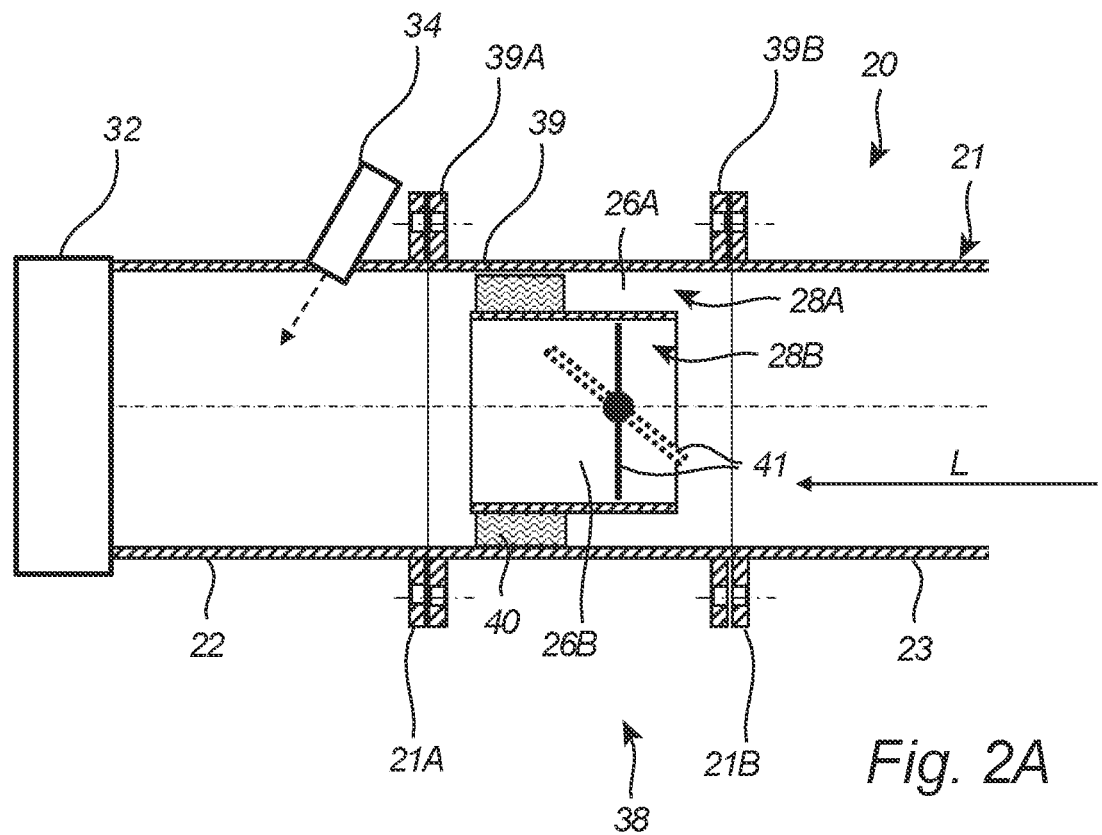
FIG. 2A is a schematic cross sectional view of an exhaust aftertreatment arrangement comprising a heating arrangement in accordance with an example embodiment of the invention.

In FIG. 2A, the exhaust aftertreatment arrangement 20 of FIG. 1 is shown in greater detail. The exhaust aftertreatment arrangement 20 comprises a fluid channel 21 for providing a fluid pathway for the exhaust gases. The exhaust aftertreatment arrangement 20 further comprises a selective catalyst reduction, SCR, catalyst 32, arranged downstream the fluid channel 21. In FIG. 2 this is exemplified as that the fluid channel 21 ends into the SCR catalyst 32. Moreover, in order provide ammonia to the SCR catalyst 32, the exhaust aftertreatment arrangement may comprise an injector 34 arranged upstream of the SCR catalyst 32 and being configured to inject a liquid reductant for providing ammonia to the SCR catalyst 32, as previously described. The reductant being for example urea. The exhaust aftertreatment arrangement 20 further comprises a heating arrangement 38 arranged upstream the SCR catalyst 32, and upstream of any injector 34, and being configured to heat the exhaust gases prior to the SCR catalyst 32. The heating arrangement 38 comprises an electrical heating element 40, here embodied as lattice or grating 40 through which the exhaust gases may be passed and heated. In FIG. 2A, the fluid pathway of the exhaust gases inside of the heating arrangement 38 is divided into a first fluid pathway 26A guiding the exhaust gases to the electrical heating element 40, and a second fluid pathway 26B for guiding the exhaust gases to bypass the electrical heating element 40.

Figure 2B:
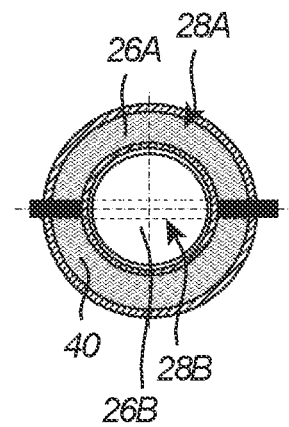
FIG. 2B is schematic cross sectional view of the first and second channel portions of the heating arrangement in FIG. 2A.

In FIG. 2A, the heating arrangement 38 comprises a first channel portion 28A comprising the first fluid pathway 26A and the electrical heating element 40, and a second channel portion 28B comprising the second fluid pathway 26B. Thus, the second channel portion 28B is separate from the first channel portion 28A. That is, the first channel portion 28A is delimited by channel walls as the channel walls circumferentially encompasses the first fluid pathway 26A, and the second channel portion 28B is delimited by channel walls as the channel walls circumferentially encompasses the second fluid pathway 26B. In FIG. 2A, the first channel portion 28A has a cross section traverse the longitudinal direction L of the exhaust aftertreatment arrangement 20 which is annularly shaped, or is shaped as an annulus, as seen in FIG. 2B. Correspondingly, the second channel portion 28B has a cross section traverse the longitudinal direction L of the exhaust aftertreatment arrangement 20 which is circular, as seen in FIG. 2B. Moreover, as also seen in both FIGS. 2A and 2B, the first channel portion 28A is annularly encompassing the second channel portion 28B, as the first channel portion 28A and the second channel portion 28B are co-axially arranged.

The exhaust aftertreatment arrangement 20, and more specifically, the heating arrangement 38, of FIG. 2A comprises valve 41 configured to control the flow of exhaust gases in the first and second fluid pathways 26A, 26B, by controlling the flow of exhaust gases to the first and second channel portions 28A, 28B. The valve 41 is operable between a first state in which the flow of exhaust gases is allowed to flow through the first channel portion 28A and the first fluid pathway 26A, and a second state in which at least a part of the flow of exhaust gases is allowed to flow through the second channel portion 28B and the second fluid pathway 26B. The second state is in FIG. 2A represented by the dotted form of the valve 41. Thus, in FIG. 2 and in the first state, the valve 41 is arranged to prevent flow of exhaust gases in the second fluid pathway 26B by covering the cross section of the second channel portion 28B, so no flow of exhaust gases is allowed through the second channel portion. Hereby, the flow of exhaust gases is allowed to flow through the first channel portion 28A and the first fluid pathway 26A and the electrical heating element 40. Typically, the electrical heating element 40 is covering the whole cross section of the first channel portion 28A, such that no flow of exhaust gases can bypass the electrical heating element 40 inside the first channel portion 28A. Correspondingly, in the second state, the valve 41 is arranged to allow flow of exhaust gases in the second fluid pathway 26B by enabling at least a part of the cross section of the second channel portion 28B to be open, so at least a part of the flow of exhaust gases is allowed through the second channel portion 28B and the second fluid pathway 26B. Hereby, the flow of exhaust gases is divided between the first channel portion 28A and the second channel portion 28B, and the induced pressure drop over the heating arrangement 38 can be reduced compared to in the first state.

Thus, the valve 41 in FIG. 2A is configured to:
in a first state, allow the flow of exhaust gases to flow to the first fluid pathway 26A while preventing flow of exhaust gases into the second fluid pathway 26B, and
in a second state, allow the flow of exhaust gases to flow to the second fluid pathway 26B and optionally the first fluid pathway 26A. For example, in the first state, the valve is configured to direct or guide the flow of exhaust gases to the first fluid pathway 26A while preventing flow of exhaust gases into the second fluid pathway 26B, and in the second state, the valve is configured to direct or guide the flow of exhaust gases to the second fluid pathway 26B and optionally the first fluid pathway 26A.

The heating arrangement 38 in FIG. 2A is removably arranged relative the fluid channel 21. Thus, the heating arrangement 38 may be removed from the fluid channel 21 and be subject to e.g. maintenance or component exchange. Owing to this, the fluid channel 21 comprises a first channel flange 21A arranged upstream of the SCR catalyst 32, and a second channel flange 21B arranged upstream of the first channel flange 21A. Hereby, the fluid channel 21 is dividable into two fluid channel portions, a downstream channel portion 22, and an upstream channel portion 23. The downstream channel portion 22 is extending downstream from the first channel flange 21A and in FIG. 2A, to the SCR catalyst 32, and the upstream channel portion 23 is extending upstream from the second channel flange 21B.

Figure 3A:
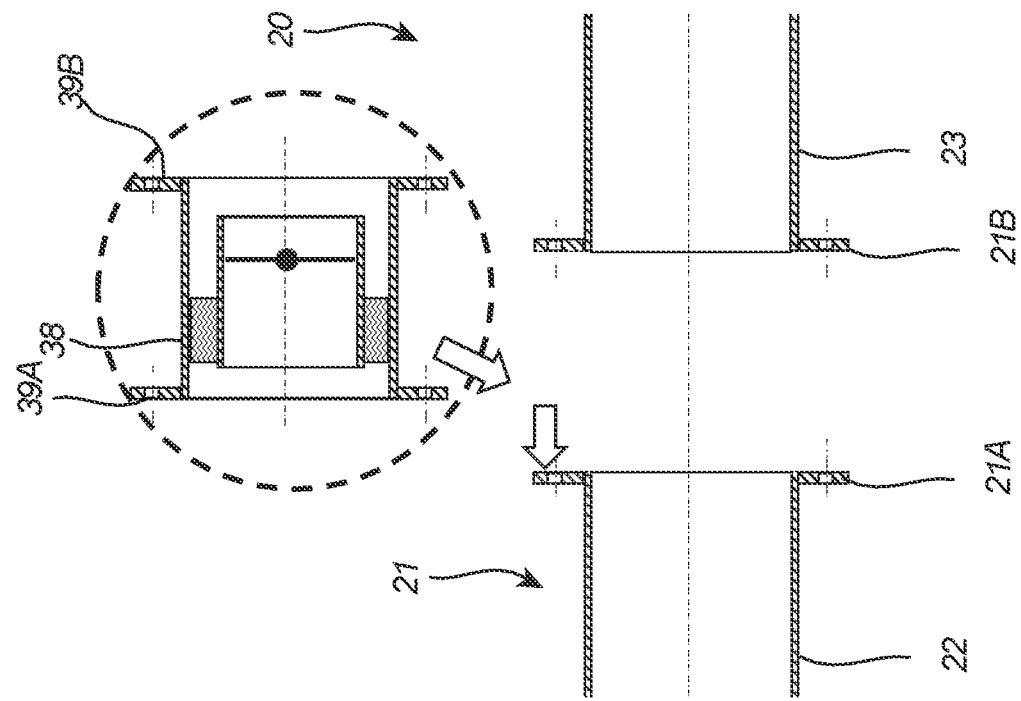
FIGS. 3A-3B shows a schematic example of how the heating arrangement is removably arranged relative the fluid channel, and is assembled/disassembled, applicable to example embodiments of the invention.
Figure 3B:
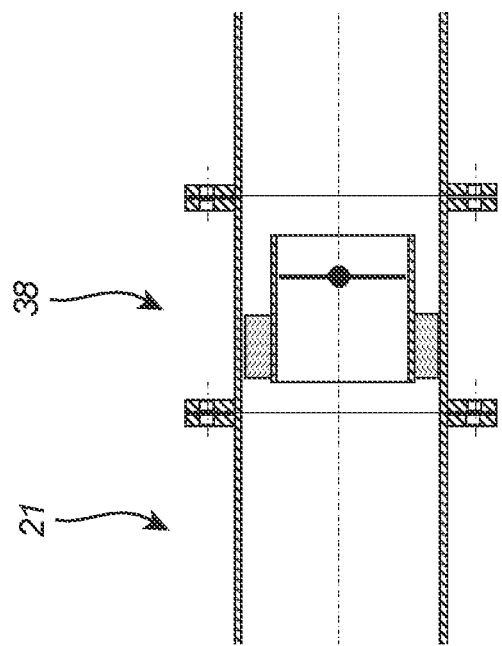

Correspondingly, the heating arrangement 38 comprises a first heating arrangement flange 39A and a second heating arrangement flange 39B arranged opposite to the first heating arrangement flange 39A. The heating arrangement 38 is removably arranged relative the fluid channel 21 by that the first channel flange 21A is removably connected to the first heating arrangement flange 39A, e.g. by screws or clamps, and by that the second channel flange 21B is removably connected to the second heating arrangement flange 39B, by e.g. screws or clamps. Thus, the heating arrangement 38 may be detached, or brought into a disassembled state, by disconnecting the first channel flange 21A from the first heating arrangement flange 39A, and disconnecting the second channel flange 21B from the second heating arrangement flange 39B. Such state is shown in FIG. 3A, in which the heating arrangement 38 is provided separately from the fluid channel 21 and in which the downstream channel portion 22 is separated from the upstream channel portion 23. Such disassembled state may be present during installation of the heating arrangement 38 to the fluid channel 21, or during maintenance of the heating arrangement 38 and/or the fluid channel 21. The heating arrangement 38 may thereafter be brought into an assembled state, as shown in FIG. 3B. Thus, in the assembled state, in which the heating arrangement 38 is attached to the fluid channel 21, the first channel flange 21A is circumferentially connected to the first heating arrangement flange 39A, and the second channel flange 21B is circumferentially connected to the second heating arrangement flange 39B.

However, it should be noted that the upstream channel portion 23 may be omitted, and the heating arrangement 38 being removably arranged to the downstream channel portion 22 only.

Turning back to FIG. 2A, in which the heating arrangement 38 is assembled to the fluid channel 21 as previously described, the heating arrangement 38 comprises an enclosing channel wall portion 39 extending from the second heating arrangement flange 39B up to the first heating arrangement flange 39A. In FIG. 2, the first and second fluid pathways 26A, 26B, and thus the first and second channel portions 28A, 28B, are housed in the enclosing channel wall portion 39. The enclosing channel wall portion 39 may be referred to as a casing, or housing, of the heating arrangement 38. That is, the electrical heating element 40 is housed within the heating arrangement 38.

The exhaust aftertreatment arrangement 20 is typically operated in the following manner: exhaust gases (to be cleaned) from the diesel engine enters the exhaust aftertreatment arrangement 20 via the upstream channel portion 23, and is passed through the heating arrangement 38 whereby the flow of exhaust gases encounter the valve 41. Depending on the position of the valve 41, the flow of exhaust gases are directed or guided to the first fluid pathway 26A and optionally to the second fluid pathway 26B by enabling and/or preventing flow of exhaust gases through the first and second channel portions 28A, 28B. For example, if the valve 41 is arranged in the first state, the complete flow of exhaust gases is allowed (e.g. by being directed or guided) to the first channel portion 28A and guided via the first fluid pathway 26A, whereby the exhaust gases will be heated by the electrical heating element 40. As the complete flow of exhaust gases is led via the electrical heating element 40, the induced pressure drop over the heating arrangement 38 will be relatively high. The induced pressure drop, when the valve 41 is arranged in the first state may be referred to as a first pressure drop. Subsequently, or prior to arranging the valve 41 in the first state, the valve 41 may be arranged in the second state, and at least a part of the flow of exhaust gases are allowed to pass through the second channel portion 28B via the second fluid pathway 26B. Thus, as there is no electrical heating element present in the second channel portion 28B, the induced pressure drop over the heating arrangement 38 will be lower compared to when the valve 41 is arranged in the first state. The induced pressure drop, when the valve 41 is arranged in the second state may be referred to as a second pressure drop, the second pressure drop being lower than the first pressure drop. Typically, as the first fluid pathway 26A is available also when the valve 41 is arranged in the second state, the induced pressure drop over the heating arrangement 38 will be based on the combined effect of flow of exhaust gases through the first and second channel portions 28A, 28B.

As shown in FIG. 2A, the electrical heating element 38 is a lattice or grating and the flow of exhaust gases will thus be heated when flowing through the lattice or grating. It should be noted that the electrical heating element may be arranged in a different way, and e.g. comprise a heating coil or a heating foam, through which the exhaust gases will be heated by flowing across a heated surface of the heating coil or heating foam.

Subsequent to passing the heating arrangement 38, the at least partly heated flow of exhaust gases continues along the fluid channel 21 into the downstream channel portion 22, and e.g. to a position in which the reductant is injected by an injector (not shown). Any injected reductant will thus be partly mixed with the heated flow of exhaust gases and the heat provided by the electrical heating element 40. The reductant (if any) and exhaust gases thereafter enter the SCR catalyst 32 for catalytic reduction of the NOx, whereafter the cleaned exhaust gases are discharged from the exhaust aftertreatment arrangement 20 or further cleaned via downstream processes.

Figure 4:
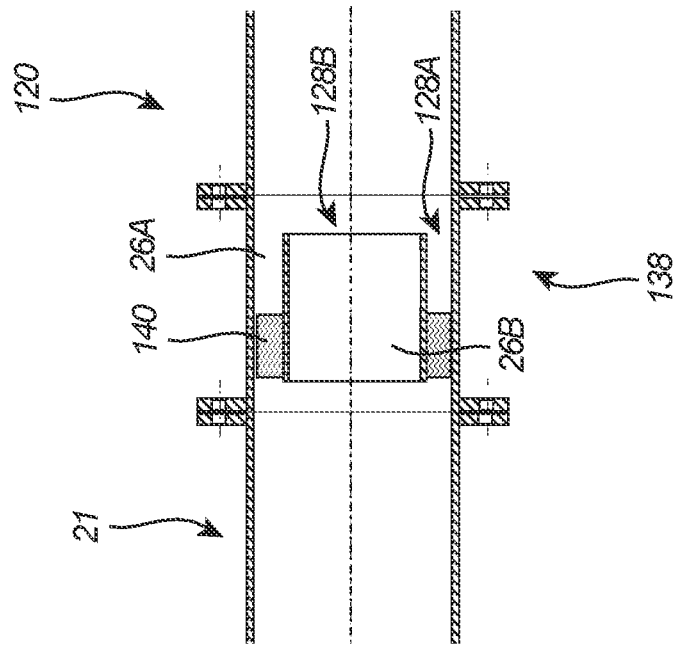
FIG. 4 is a schematic cross sectional view of an exhaust aftertreatment arrangement comprising a heating arrangement in accordance with an example embodiment of the invention.

In FIG. 4, an alternative heating arrangement 138 of an exhaust aftertreatment arrangement 120 is shown. The heating arrangement 138 may e.g. be arranged in a fluid channel 21 corresponding to the embodiment shown in FIG. 2A, and may thus function in principle in the same way as the embodiment shown in FIG. 2A. However, for the heating arrangement 138 of FIG. 4, the valve configured to control the flow of exhaust gases in the first and second fluid pathways 26A, 26B is omitted. Thus, the flow of exhaust gases through a first channel portion 128A comprising the first fluid pathway 26A and the electrical heating element 140, and through a second channel portion 128B comprising the second fluid pathway 26B, is divided between two fluid pathways in accordance with fundamental flow principles. Thus, the amount of heat added to the exhaust gases may be controlled to a larger extent by the power of the electrical heating element 140 as compared to the embodiment shown in FIG. 2A. Moreover, the pressure drop over the heating arrangement 138 will not vary as much as for the embodiment in FIG. 2A, as there is no valve preventing flow through the second channel portion 128B.

Figure 5:
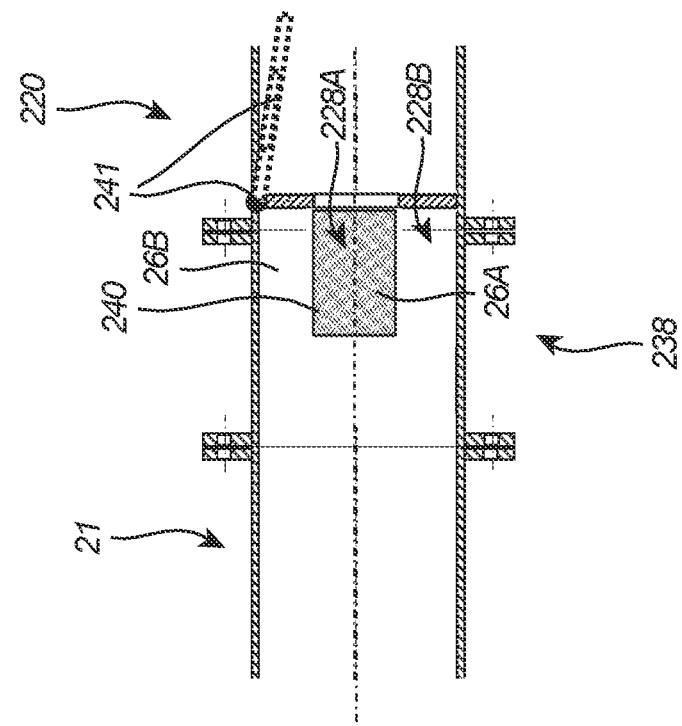
FIG. 5 is a schematic cross sectional view of an exhaust aftertreatment arrangement comprising a heating arrangement in accordance with another example embodiment of the invention.

Turning to FIG. 5 showing an exhaust aftertreatment arrangement 220 which at least in part corresponds to that of the exhaust aftertreatment arrangement 20 of FIG. 2A, at least by the inclusion of a valve 241 configured to control the flow of exhaust gases in the first and second fluid pathways 26A, 26B, and thus functions in principle in the same way as the embodiment shown in FIG. 2A. However, for the heating arrangement 238 of FIG. 5, the valve 241 is arranged externally of the heating arrangement 238, and is instead comprised in the fluid channel 21 upstream of the heating arrangement 238. The valve 241 is here rotationally attached to the channel wall of the fluid channel 21, and is operable between a first state in which the flow of exhaust gases is allowed to enter a first channel portion 228A comprising the first fluid pathway 26A, and a second state in which at least a part of the flow of exhaust gases is allowed to enter a second channel portion 228B comprising the second fluid pathway 26B. The valve 241 comprises a central opening which is circumferentially surrounded by an obstructing portion. In FIG. 5, showing the first state of the valve 241, the central opening aligns with the first channel portion 228A so that the flow of exhaust gases is allowed via the first fluid pathway 26A and the electrical heating element 240, while the obstructing portion aligns with the second channel portion 228B so that no flow of exhaust gases is allowed (e.g. by being directed or guided) via the second fluid pathway 26B. In the second state, represented by the dotted form of valve 241, the valve 241 has been rotated towards the channel wall of the fluid channel 21. Thus, the valve 241 is here arranged to allow flow of exhaust gases in the second channel portion 228B via the second fluid pathway 26B by no longer obstructing flow into the second channel portion 228B. Hereby, the flow of exhaust gases is divided between the first channel portion 228A and the second channel portion 228B, and the induced pressure drop over the heating arrangement 238 can be reduced compared to in the first state. Furthermore, In FIG. 5, the second channel portion 228B has a cross section traverse the longitudinal direction of the exhaust aftertreatment arrangement 220 which is annularly shaped, or is shaped as an annulus. Correspondingly, the first channel portion 228A has a cross section traverse the longitudinal direction of the exhaust aftertreatment arrangement 220 which is circular. Moreover, the second channel portion 228B is annularly encompassing the first channel portion 228A, as the second channel portion 228B and the first channel portion 228A are co-axially arranged, in FIG. 5.

Figure 6:
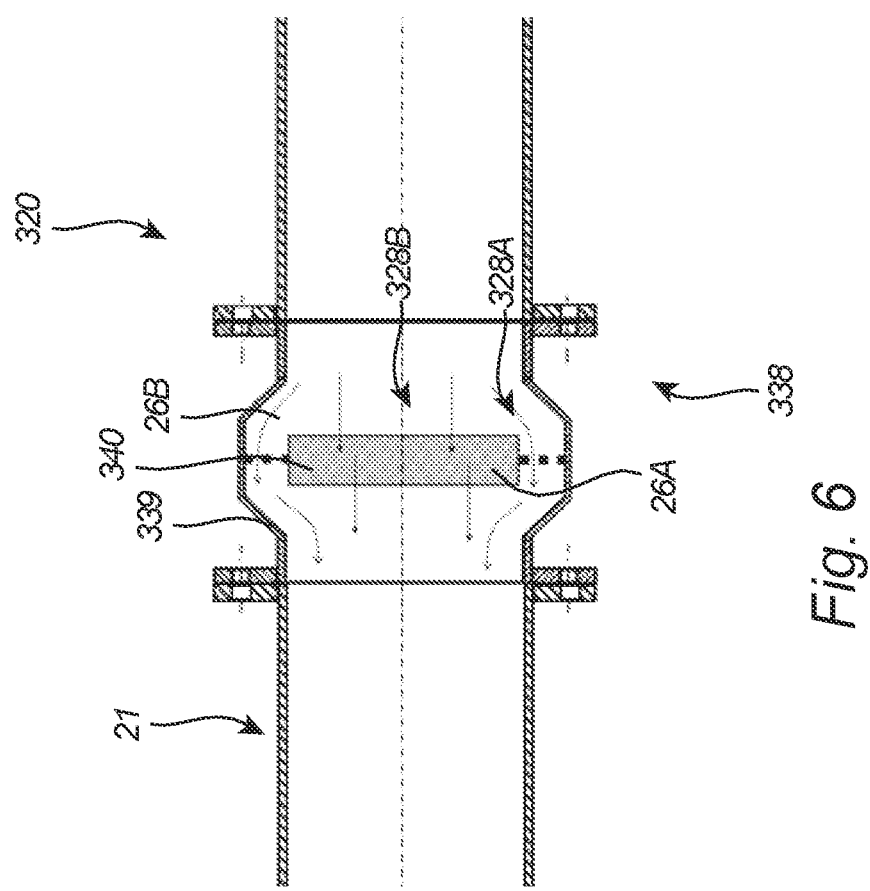
FIG. 6 is a schematic cross sectional view of an exhaust aftertreatment arrangement comprising a heating arrangement in accordance with yet another example embodiment of the invention.

Yet another embodiment of a heating arrangement 338 of an exhaust aftertreatment arrangement 320 is shown in FIG. 6. The heating arrangement 338 may e.g. be arranged in a fluid channel 21 corresponding to the embodiment shown in FIG. 2A, and is furthermore very similar to the embodiment shown in FIG. 4 as no valve configured to control the flow of exhaust gases in the first and second fluid pathways 26A, 26B is present. However, in FIG. 6, a first channel portion 328A comprising the first fluid pathway 26A is delimited by an enclosing channel wall portion 339 (similar to the enclosing channel wall portion 39 of the embodiment shown in FIG. 2A) and the outer surface of the electrical heating element 340. Correspondingly, a second channel portion 328B comprising the second fluid pathway 26B is delimited by the outer structures of the electrical heating element 340. As the electrical heating element 340 is centrally arranged in the heating arrangement 338, the second channel portion 328B has a cross section traverse the longitudinal direction of the exhaust aftertreatment arrangement 320 which is annularly shaped, or is shaped as an annulus. Correspondingly, the first channel portion 328A has a cross section traverse the longitudinal direction of the exhaust aftertreatment arrangement 320 which is circular, or having any other enclosing shape defined by the outer structures of the electrical heating element 340. Moreover, the second channel portion 328B is annularly encompassing the first channel portion 328A, as the second channel portion 328B and the first channel portion 328A are co-axially arranged in FIG. 6. Moreover, the enclosing channel wall portion 339 is formed as a bulge compared to the fluid channel 21, enabling flow of the exhaust gases to by-pass the electrical heating element 340 in an efficient way. Moreover, the bulge-formed enclosing channel wall portion 339 improves mixing of the flow of exhaust gases downstream of the heating arrangement 338, as the flow of exhaust gases in the second channel portion 238B is forced to turn when by-passing the electrical heating element 349.

It should be understood that the heating arrangements 138, 238, 338 of FIGS. 4-6 typically is removably arranged relative the fluid channel 21 by means of a first and second channel flanges and corresponding first and second heating arrangement flanges, as has been previously described with the embodiment of e.g. FIG. 2A.

Figure 7:
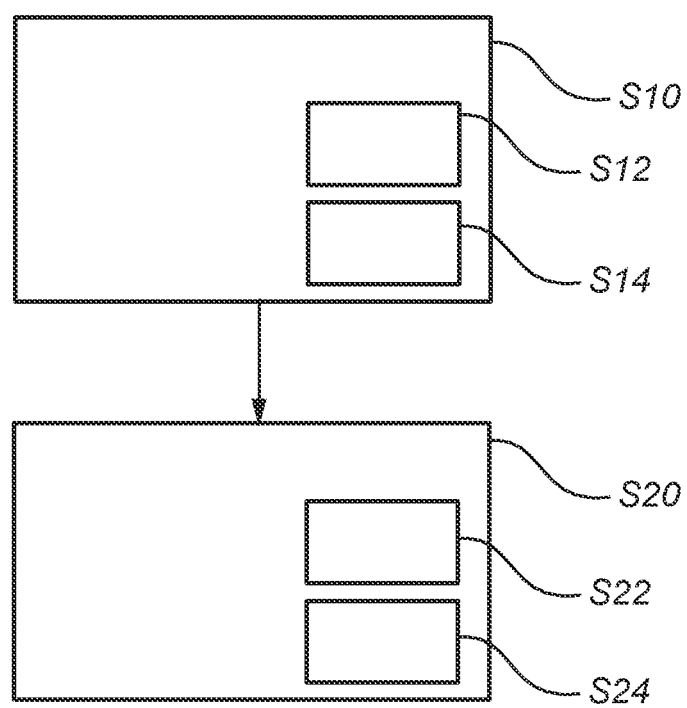
FIG. 7 is a flowchart illustrating the steps of a method in accordance with an example embodiment of the invention.

A method for assembling and/or disassembling a heating arrangement relative a fluid channel of an exhaust aftertreatment arrangement for converting NOx emissions, will now be generally described with reference to FIG. 7. Thus, the exhaust aftertreatment arrangement may be that of FIGS. 2A-2B, 3A-3B, 4, 5 and 6, with associated heating arrangement. Thus, the exhaust aftertreatment arrangement comprises a fluid channel for providing a fluid pathway for the exhaust gases, a selective catalyst reduction, SCR, catalyst, arranged in or downstream the fluid channel, and optionally an injector configured to inject a liquid reductant for providing ammonia to the SCR catalyst, the injector being arranged upstream of the SCR catalyst. The heating arrangement typically comprises an electrical heating element, a first fluid pathway for guiding the exhaust gases to the electrical heating element, and a second fluid pathway for guiding the exhaust gases to bypass the electrical heating element, the heating arrangement being removably connectable to the fluid channel.

In a first step S10, the heating arrangement is assembled to the fluid channel such that the heating arrangement is arranged upstream of the SCR catalyst, such that the flow of exhaust gases may be controlled to flow through the heating arrangement via the first and/or second fluid pathways.

As been described with reference to the embodiment of FIGS. 2A-2B, 3A-3B, the fluid channel may comprise a first channel flange arranged upstream of the SCR catalyst, and the heating arrangement may comprise a first heating arrangement flange. Thus, the first step S10 of assembling may optionally comprise a first sub-step S12 of circumferentially connecting the first channel flange to the first heating arrangement flange. Moreover, as has also been described earlier, the fluid channel may further comprise a second channel flange arranged upstream of the first channel flange, and the heating arrangement may further comprise a second heating arrangement flange arranged opposite to the first heating arrangement flange. Thus, the first step of assembling S10 may comprise the first sub-step S12 of circumferentially connecting the first channel flange to the first heating arrangement flange and a second sub-step S14 of circumferentially connecting the second channel flange to the second heating arrangement flange.

In a second step S20, which may be performed subsequent to the first step S10, and any of the optional sub-steps S12, S14, or be performed instead of, or prior to the first step S10, and any of the optional sub-steps S12, S14, the heating arrangement is disassembled from the fluid channel. Correspondingly to the first and second sub-steps S12, S14, the second step S20 of disassembling may comprise a third sub-step S22 of disconnecting the first channel flange from the first heating arrangement flange and fourth sub-step S24 of disconnecting the second channel flange from the second heating arrangement flange.

It is to be understood that the present invention is not limited to the embodiments described above and illustrated in the drawings; rather, the skilled person will recognize that many changes and modifications may be made within the scope of the appended claims. For example, the electrical heating element may be powered via an electrical connection which is integrated in a housing of the heating arrangement. For example, the operating power of the electrical heating element may be between 300 W and 15000 W. Moreover, the exhaust aftertreatment arrangement may be used for converting NOx emission from the exhausts of other engines than diesel engines. For example, the present exhaust aftertreatment arrangement may be used to convert NOx emissions from the exhaust of internal combustion engines based on CNG (Compressed Natural Gas), LPG (Liquified Pressurized Gas), DME (DiMethylEther), and/or H2 (Hydrogen).

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An exhaust aftertreatment arrangement for cleaning exhaust gases, the exhaust aftertreatment arrangement comprising:
   a fluid channel for providing a fluid pathway for the exhaust gases,
   a selective catalyst reduction, SCR, catalyst, arranged in or downstream the fluid channel,
   a heating arrangement for heating the exhaust gases, the heating arrangement being arranged upstream of the SCR catalyst and comprising an electrical heating element, a first fluid pathway for guiding the exhaust gases to the electrical heating element, and a second fluid pathway for guiding the exhaust gases to bypass the electrical heating element, wherein the heating arrangement is removably arranged relative the fluid channel.

2. The exhaust aftertreatment arrangement according to claim 1, wherein the heating arrangement comprises a first channel portion comprising the first fluid pathway and the electrical heating element, and a second channel portion comprising the second fluid pathway, the second channel portion being separate from the first channel portion.

3. The exhaust aftertreatment arrangement according to claim 2, wherein the first channel portion and the second channel portion are co-axially arranged.

4. The exhaust aftertreatment arrangement according to claim 2, wherein the first channel portion is annularly encompassing the second channel portion, or wherein the second channel portion is annularly encompassing the first channel portion.

5. The exhaust aftertreatment arrangement according to claim 1, further comprising at least one valve configured to control the flow of exhaust gases in the first and second fluid pathways.

6. The exhaust aftertreatment arrangement according to claim 5, wherein the heating arrangement comprises the valve.

7. The exhaust aftertreatment arrangement according to claim 5, wherein the valve is operable between a first state in which the flow of exhaust gases is allowed to flow through the first fluid pathway, and a second state in which at least a part of the flow of exhaust gases is allowed to flow through the second fluid pathway.

8. The exhaust aftertreatment arrangement according to claim 1, wherein the fluid channel comprises a first channel flange arranged upstream of the SCR catalyst and the heating arrangement comprises a first heating arrangement flange, such that, in an assembled state, the first channel flange is circumferentially connected to the first heating arrangement flange, and wherein the heating arrangement is removably arranged relative the fluid channel at least by that the first channel flange is removably connected to the first heating arrangement flange.

9. The exhaust aftertreatment arrangement according to claim 8, wherein the fluid channel further comprises a second channel flange arranged upstream of the first channel flange, and wherein the heating arrangement further comprises a second heating arrangement flange arranged opposite to the first heating arrangement flange, such that, in the assembled state, the second channel flange is circumferentially connected to the second heating arrangement flange, and wherein the heating arrangement is removably arranged relative the fluid channel by that the first channel flange is removably connected to the first heating arrangement flange and by that the second channel flange is removably connected to the second heating arrangement flange.

10. The exhaust aftertreatment arrangement according to claim 8, wherein the heating arrangement comprises an enclosing channel wall portion extending up to the first heating arrangement flange, and wherein the first and second fluid pathways are housed in the enclosing channel wall portion.

11. A heating arrangement for an exhaust aftertreatment arrangement for converting NOx emissions, the exhaust aftertreatment arrangement comprising a fluid channel for providing a fluid pathway for the exhaust gases and a selective catalyst reduction, SCR, catalyst, arranged in or downstream the fluid channel, wherein the heating arrangement comprises: an electrical heating element, a first fluid pathway for guiding the exhaust gases to the electrical heating element, and a second fluid pathway for guiding the exhaust gases to bypass the electrical heating element, wherein the heating arrangement is configured to be removably arranged relative the fluid channel.

12. The heating arrangement according to claim 11, further comprising a first heating arrangement flange and a second heating arrangement flange arranged opposite to the first heating arrangement flange, wherein the first heating arrangement flange is circumferentially connectable to a first channel flange of the fluid channel, and the second heating arrangement flange is circumferentially connectable to a second channel flange of the fluid channel.

13. A vehicle comprising an exhaust aftertreatment arrangement according to claim 1, or a heating arrangement.

14. The exhaust aftertreatment arrangement according to claim 8, further comprising an injector configured to inject a liquid reductant for providing ammonia to the SCR catalyst, the injector being arranged upstream of the SCR catalyst, wherein the injector is arranged just downstream the first channel flange of the first channel flange.

15. The exhaust aftertreatment arrangement according to claim 1, further comprising an emission reducing module being a diesel particulate filter (DPF) and/or a diesel oxidation catalyst (DOC) arranged and configured to convert carbon monoxide and hydrocarbons into carbon dioxide, wherein the emission reducing module is arranged upstream of the heating arrangement.

* * * * *